United States Patent [19]
Kodama et al.

[11] Patent Number: 5,218,451
[45] Date of Patent: Jun. 8, 1993

[54] SPINDLE SERVO CONTROL FOR ELECTRONIC STILL CAMERA

[75] Inventors: Yasumasa Kodama, Kanagawa; Shinji Katsuki; Takashi Fukushimai, both of Tokyo; Takashi Hishinuma, Kanagawa, all of Japan

[73] Assignee: Sony Corporation, Tokyo, Japan

[21] Appl. No.: 419,271

[22] Filed: Oct. 10, 1989

[30] Foreign Application Priority Data

Oct. 11, 1988 [JP] Japan .................. 63-255708

[51] Int. Cl.$^5$ ............................................. H04N 5/30
[52] U.S. Cl. ..................... 358/335; 358/906; 358/909; 358/310; 358/342; 369/50
[58] Field of Search ............... 358/906, 909, 343, 342, 358/341, 335, 310; 360/33.1, 35.1; 354/127.11, 127.12; 369/50

[56] References Cited

U.S. PATENT DOCUMENTS

| | | | |
|---|---|---|---|
| 4,236,796 | 12/1980 | Hayashi et al. | 354/127.12 |
| 4,426,144 | 1/1984 | Kawazoe | 354/145.1 |
| 4,504,866 | 3/1985 | Saito | 360/35.1 |
| 4,584,598 | 4/1986 | Kutaragi | 360/35.1 |
| 4,599,657 | 7/1986 | Kinoshita et al. | 358/906 |
| 4,739,417 | 4/1988 | Ogawa | 358/906 |
| 4,740,828 | 4/1988 | Kinoshita | 358/906 |
| 4,758,909 | 7/1988 | Harase | 358/906 |
| 4,814,811 | 3/1989 | Saito et al. | 358/909 |
| 4,849,819 | 7/1989 | Ishiguro et al. | 358/909 |
| 4,928,137 | 5/1990 | Kinoshita | 358/906 |

FOREIGN PATENT DOCUMENTS

2953961 4/1980 Fed. Rep. of Germany .
63-237043 10/1988 Japan .

OTHER PUBLICATIONS

Patent Abstracts of Japan, vol. 10, No. 5 (E-372), Oct. 1, 1986; & JP-A-60 170 380 (Fuji Shashin Film K.K.) Sep. 3, 1985; the whole document.
Patent Abstracts of Japan, vol. 13, No. 40 (P-820), Jan. 30, 1989; and JP-A-63 237 043 (Sony Corp.) (Oct. 3, 1988); the whole document.
Patent Abstracts of Japan, vol. 12, No. 354 (P-761), Sep. 22, 1988; & JP-A-63 106 632 (Seiko Instr. & Electronics Ltd) May 11, 1988; the whole document.
Patent Abstracts of Japan, vol. 9, No. 280 (E-356)) [2003], Nov. 8, 1985; & JP-A-60 123 172 (Canon K.K.) & JP-A-60 123 172 (Canon K.K.) Jul. 1, 1985; the whole document.
Patent Abstracts of Japan, vol. 5, No. 110 (P-071), Jul. 17, 1981; & JP-A-56 052 737 (Canon K.K.) May 12, 1981.
Patent Abstracts of Japan, vol. 7, No. 208 (E-198), Sep. 14, 1983; & JP-A-58 104 573 (Nihon Kougaku Kogyo K.K.) Jun. 22, 1983.
Patent Abstracts of Japan, vol. 9, No. 24 (P-331), Jan. 31, 1985; & JP-A-59 168 423 (Fuji Shashin Film K.K.) Sep. 22, 1984.

Primary Examiner—Tommy P. Chin
Assistant Examiner—Khoi Trouong
Attorney, Agent, or Firm—Lewis H. Eslinger; Jay H. Maioli; Donald S. Dowden

[57] ABSTRACT

In an electronic camera that comprises image-producing element, a signal processing circuit for processing signals from the image-producing element, a record medium for recording signals from the signal processing circuit, a motor for driving the record medium, flash having a charging circuit, a power supply, and a controller for controlling the camera operation, the power to the motor is interrupted by the controller for the duration of time the charging circuit is being charged. In another embodiment, the power is interrupted to both the motor and the signal processing circuit by the controller for the duration of charging, so that a large charging current is available and the signal processing circuit is prevented from erroneous operation due to source voltage drops.

8 Claims, 6 Drawing Sheets

SPINDLE SERVO CONTROL FOR ELECTRONIC STILL CAMERA

BACKGROUND OF THE INVENTION

1. Field of the Invention

This invention relates generally to an electronic still camera and, more particularly, to a power supply circuit for an electronic still camera having a flash generating device.

2. Description of the Background

In a so-called electronic camera, information relating to an image formed by the lens is converted into electrical signals and magnetically recorded on a magnetic record medium. In such camera, it is generally not required to supply power to both an image-producing portion and to a recording portion at the same time, for example, to a motor for driving a magnetic disc at the same time the focus of the lens is being adjusted. Therefore, there is usually an operating member provided to enable a first switch and a second switch to be closed in turn, so that when the first switch is closed by the operating member power is supplied to both the image-producing portion and the recording portion, whereby preparation for rotating the magnetic disc by the motor is made, the condenser used for generating flash is charged, and so on. Then, the second switch is closed, information of a desired image is magnetically recorded on the magnetic disc.

Figure 5A:
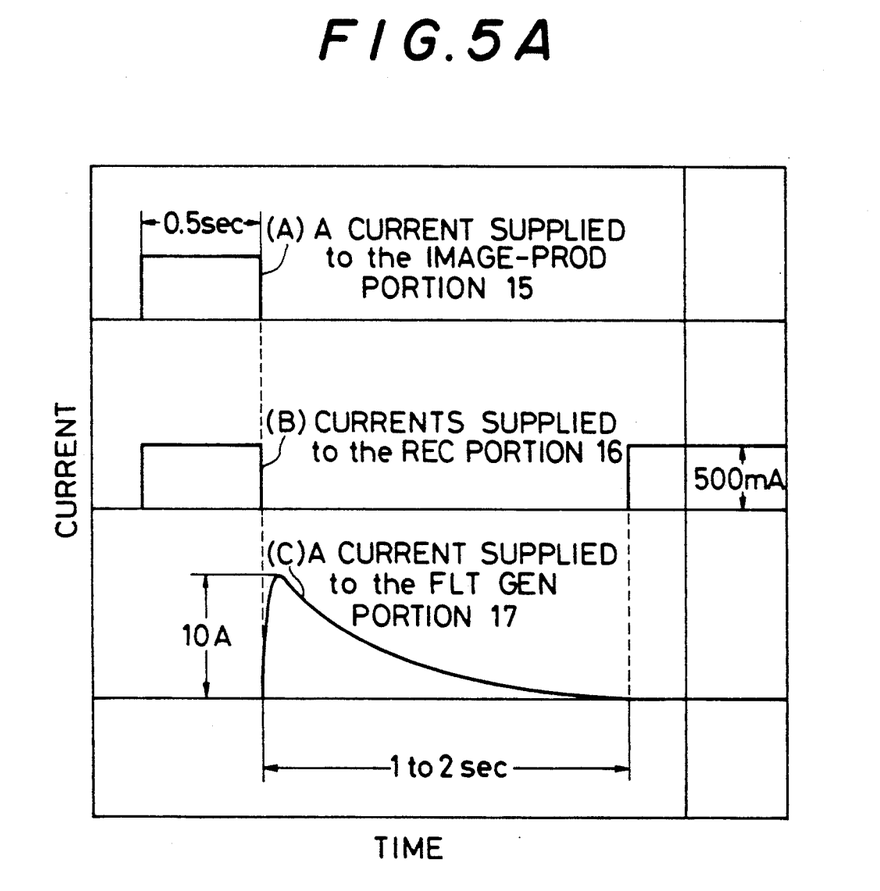
FIG. 5A is a graphical representation of a time-current relationship present in the electronic camera of FIG. 1.
Figure 5B:
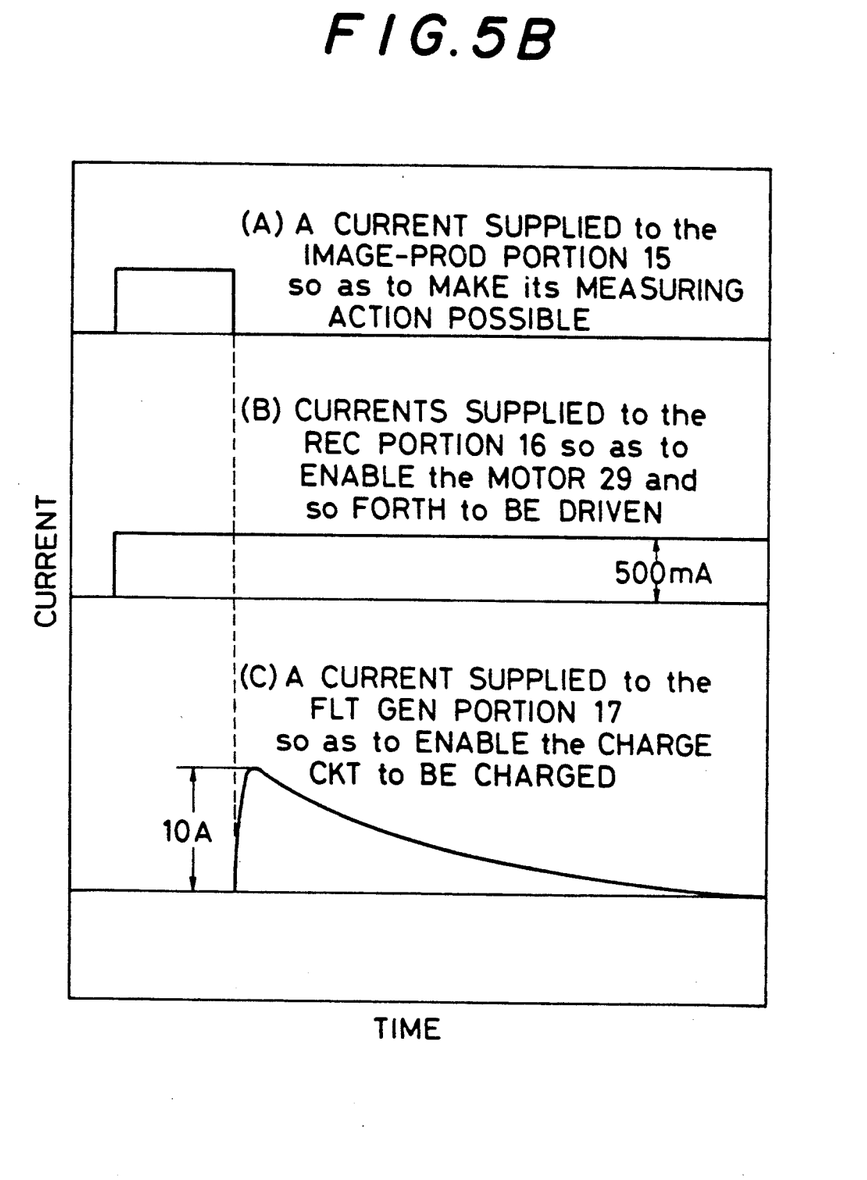
FIG. 5B is graphical representation of a time-current relationship present in a conventional electronic camera.

In the above-described electronic camera, however, when the first switch is closed, preparations for driving the motor and charging the condenser are simultaneously made, as represented in FIG. 5B. FIG. 5B graphically represents a time-current relation for the various operations, and shows that a concentrated charging current cannot be supplied to the main condenser for charging it in a relatively short period of time. Thus, the charging period for the condenser is unduly prolonged. Furthermore, a large charging current, for example, about 10A transiently flows for the duration of charging, particularly at the initial stage of charging, so that the voltage available for application to a signal processing circuit of the camera is reduced to an unacceptable level. Therefore, because of this voltage reduction, malfunctions of the signal processing circuit of the camera are apt to occur.

OBJECTS AND SUMMARY OF THE INVENTION

Accordingly, it is an object of the present invention to provide an electronic camera that can eliminate the above-noted defects inherent in the prior art.

It is another object of the present invention to provide an electronic camera in which a current supplied to a motor for driving the magnetic disc is interrupted while charging the flash generating circuit, so that a large charging current is available for the duration of charging the flash generating portion and so that the time required for charging can be lessened.

A further object of the present invention is to provide an electronic camera in which currents are not supplied to all signal processing circuits, including a recording circuit as well as the motor for driving the magnetic record medium, for the duration of charging the flash generating portion, so that the signal processing circuit is prevented from erroneous functioning due to source voltage drops caused by the charging operation.

In accordance with an aspect of this invention, an electronic camera comprises an image-producing element and a signal processing circuit for converting output signals from the image-producing element into recordable electronic signals suitable for recording by a record medium. A motor is provided for rotating the record medium and a flash generating circuit has a charging circuit capable of saving electric power that is requisite for producing the flash. A power supply supplies power to the motor and to the charging circuit, and a controller controls the power supplied to the flash generating circuit and to the signal processing circuit. Furthermore, in an electronic camera according to the present invention, the power is prevented from being supplied to the disc-drive motor by the controller for the duration of the charging operation.

In accordance with another aspect of the present invention, the power is prevented from being supplied to the disc-drive motor and also to the signal processing circuit by the controller for the duration of the charging operation.

Therefore, in an electronic camera in accordance with the present invention a large charging current is available in the flash generating portion for the duration of the charging operation, even though a source voltage drop is developed due to such charging, and any low voltage caused by the changing operation is prevented from being supplied to the signal processing circuit of the camera.

The above and other objects, features, and advantages of this invention will be apparent from the following detailed description of illustrative embodiments thereof to be read in connection with the accompanying drawings, wherein like reference numerals identify the same or corresponding parts in the several views.

DETAILED DESCRIPTION OF PREFERRED EMBODIMENTS

Figure 1:
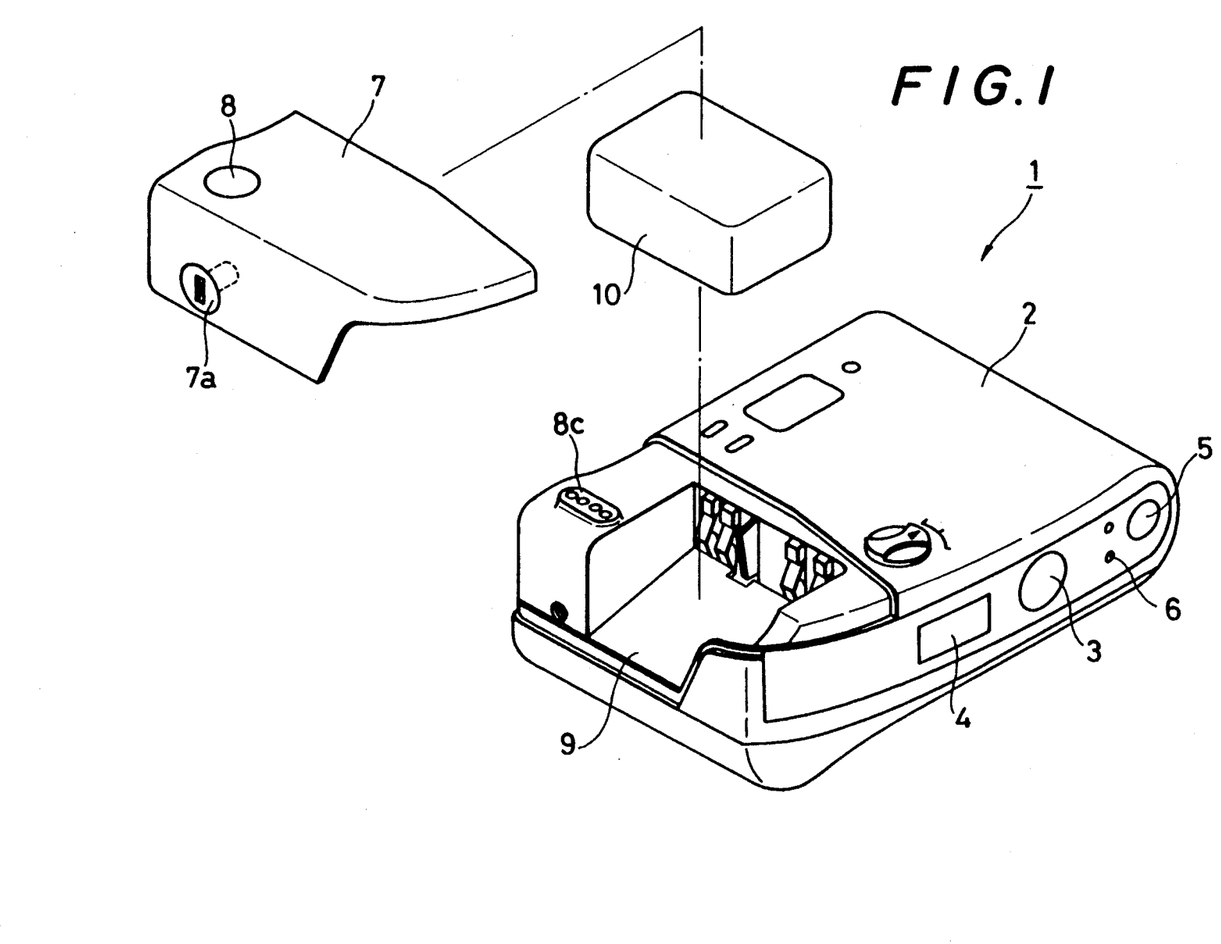
FIG. 1 is a partially exploded, perspective view of an electronic camera according to an embodiment of the present invention.

In FIG. 1 an electronic camera 1 is shown that embodies the present invention, in which images produced by lenses are converted into electrical signals by an image sensor unit, such as a CCD, and recorded on a magnetic disk. More specifically, a camera body 2 has in a front surface a lens 3 for focussing the images, a flash 4, and a viewfinder 5. A photoelectronic device 6 incorporated in a circuit described below for measuring the intensity of the light that is reflected from an object is arranged on the front surface of camera body 2. A photo transistor, which has a good response to light, is often used as photoelectronic device 6. The operation of the flash unit is controlled in correspondence with the output of the photoelectronic device 6, and the light radiation ceases as soon as the amount of light reaches a proper level.

A recess 9 into which a battery unit 10, comprising secondary batteries or dry batteries, acting as a power source, is formed in the left top side of camera body 2, and a cover 7 for covering recess 9 is detachably secured to camera body 2 with a fastener 7a. A shutter-release button 8 disposed in cover 7 closes in turn first and second contacts of switch 8c when depressed.

Figure 3:
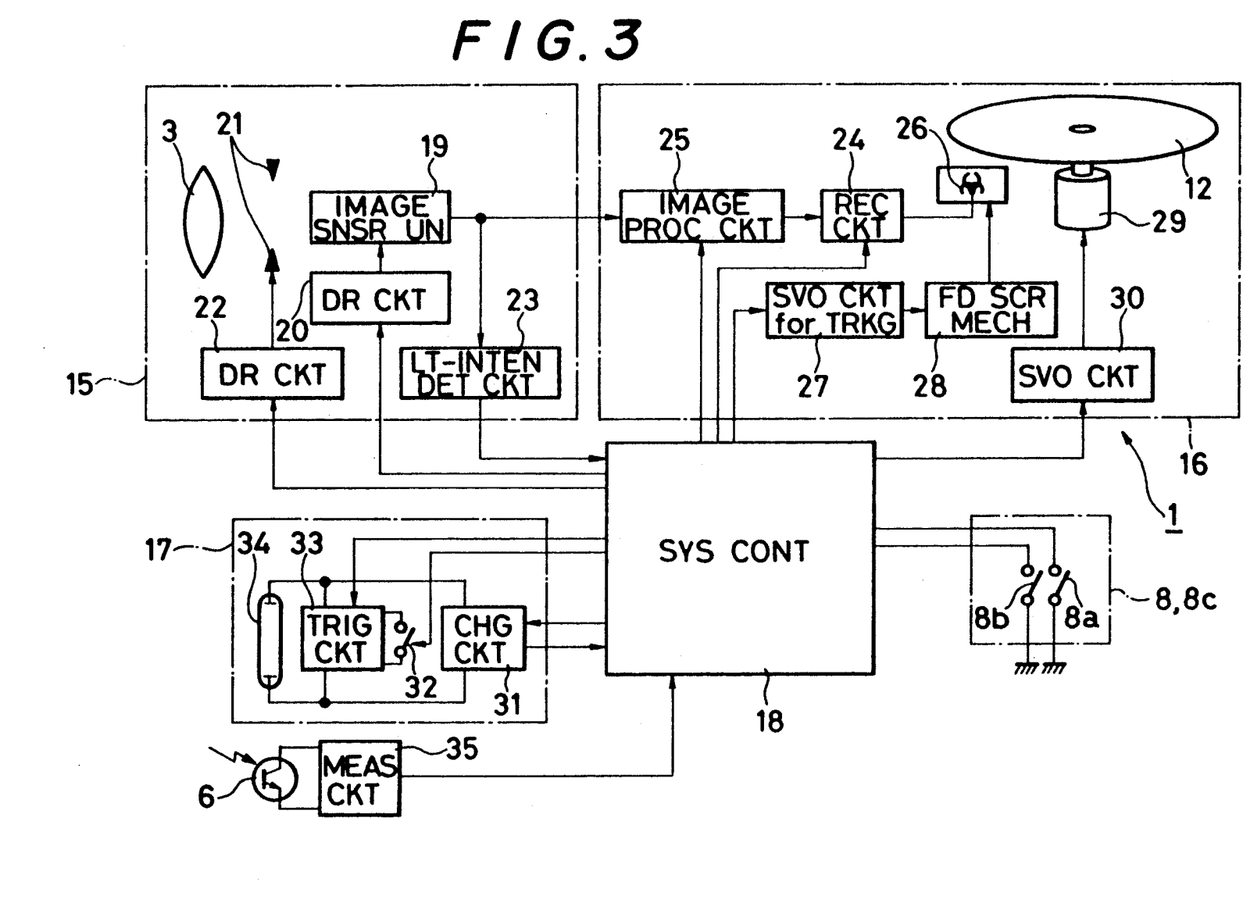
FIG. 3 is a schematic in block diagram form of the operable elements of the electronic camera of FIG. 1.

When the first contacts of switch 8c are closed, power is supplied to an image-producing portion 15, a recording portion 16, a flash generating circuit 17, etc., as shown in FIG. 3. As a result, the light reflected from the object to be recorded is measured and the image-producing portion 15, the recording portion 16, etc. are placed in respective stand-by states.

When the second contacts of switch 8c are closed, signals representing the image are recorded on the magnetic disk 12. It is to be noted that the shutter-release button 8 is biased in a direction to protrude from camera body 2 due to the force of a spring, not shown.

Figure 2:
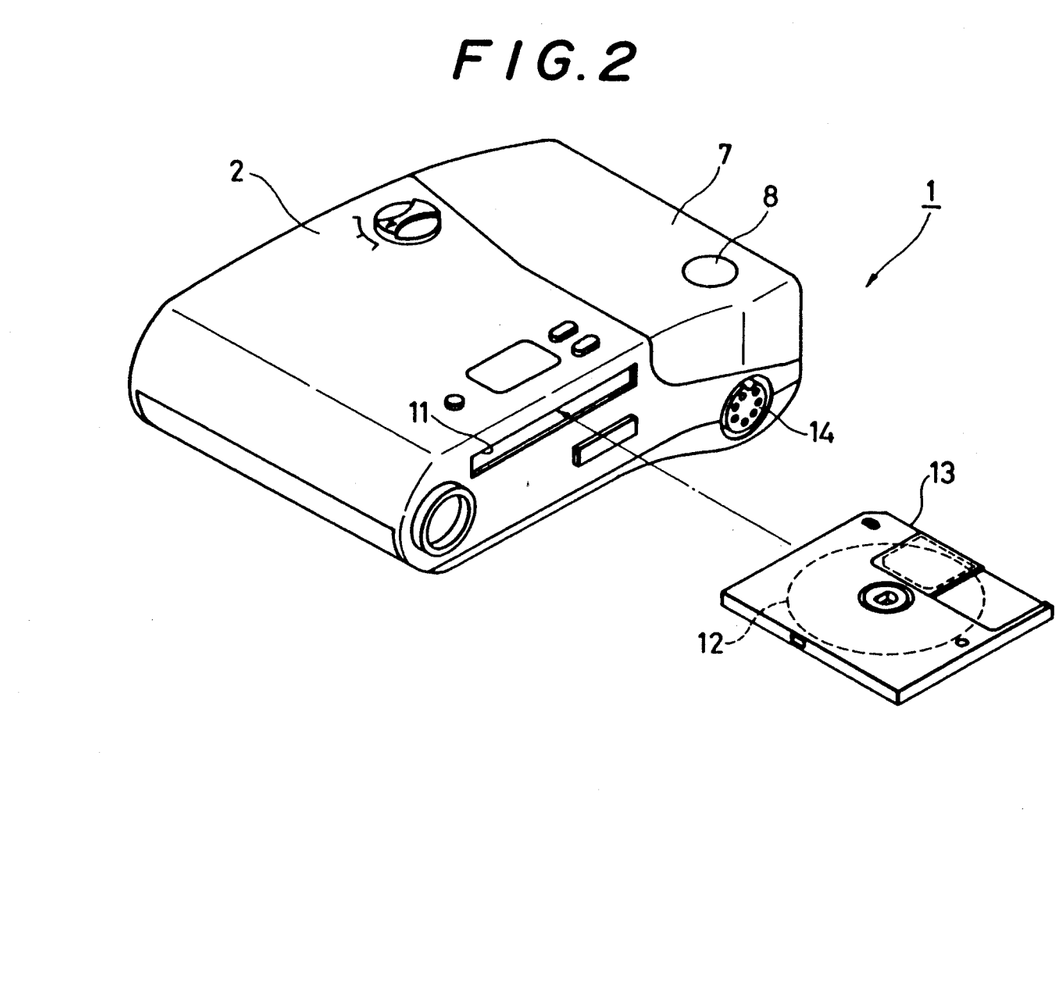
FIG. 2 is a perspective view of the electronic camera of FIG. 1, shown with a record medium cassette.

As shown in FIG. 2, formed in the rear of camera body 2 is a cassette insertion opening 11, through which a disk cassette 13 that internally accommodates a rotatable magnetic disk 12, shown in phantom, is inserted. A socket 14 having input terminals is also provided in the rear of the box 2, and power can be supplied through socket 14 when a suitable plug connected to a reproducing apparatus (not shown) is inserted in socket 14.

FIG. 3 is a schematic in block diagram form of the principal elements of electronic camera 1 and includes the image-producing portion 15 in which signals representing the images of objects are produced, the recording portion 16 in which the signals from image-producing portion 15 are processed and converted into signals capable of being recorded on magnetic disk 12, flash generating portion 17, and a system controller 18, whereby various operations of camera 1, such as the control o f signal processing, the control of the supplied power, etc., are conducted.

An image sensor unit 19, arranged behind lens 3, may be an MOS-type area image sensor, a CCD-type area image sensor or the like, and an electronic shutter for controlling the light in the optical path incident on image sensor unit 19 are operated by a driving circuit 20. It is to be noted that image sensor unit 19 can also be used to measure the amount of light reflected from the object being photographed that arrives at the surface thereof to that the exposure can be controlled.

An iris diaphragm 21 arranged between lens 3 and image sensor unit 19 is controlled by a motor that is part of another driving circuit 22. Driving circuits 20 and 22 perform predetermined functions in response to control signals from system controller 18. A light-intensity detecting circuit 23 has an input connected to the output of image sensor unit 19 and receives signals produced by image sensor unit 19 to measure the amount of light arriving at image sensor unit 19. Then, signals proportional to the amount of incident light are sent to system controller 18. For example, when an average of the incident light is measured, the average light intensity is detected and detection signals are sent to system controller 18, that produces control signals for controlling the exposure by driving circuits 20 and 22. Driving circuit 20 controls the charge storage time of the image sensor unit on the basis of such control signals and varies the speed of the shutter, not shown. Driving circuit 22 changes the control opening of the iris diaphragm 21 on the basis of such control signals.

The recording circuit 24 included in recording portion 16 of camera 1 operates to modulate signals from image sensor unit 19 fed through an image processing circuit 25, in order to convert the signals from image sensor unit 19 into magnetically recordable signals.

When shutter-release button 8 is depressed until the second contacts 8b of the switch formed by button 8 and contacts 8c are closed, signals from recording circuit 24 are recorded on magnetic disk 12, with a predetermined timing by a magnetic head 26. During such recording, the position of magnetic head 26 is controlled by a feed screw mechanism, which includes a tracking servo circuit 27, and a stepping motor (not shown) is controlled by control signals from system controller 18. Further, the rotating speed of a motor 29, which holds and drives magnetic disk 12, is controlled by another servo circuit 30.

A charging circuit 31 is provided in order to store the energy necessary to radiate a flash of bright light when, in view of the intensity of light measured by a photometer included in image-producing portion 15, it becomes apparent that an Exposure Value (EV) is lower than a predetermined value, for example, "EV9". A main condenser (not shown) of charging circuit 31 is charged upon a charge command signal from system controller 18 and, when the charge is complete, a signal indicating that condition is produced by charge circuit 31 and fed to system controller 18.

When shutter-release button 8 is pushed to the extent the second contacts 8b of switch contacts 8c are closed, a switch 32 for activating a trigger circuit 33 is closed and trigger circuit 33 begins to discharge. Then, an electric-discharge lamp 34, for example a xenon gas discharge lamp, is switched on and begins to radiate light. The reflected light rays from the object that is lit up by the light from discharge lamp 34 arrive at the detecting element of photoelectronic device 6, and signals corresponding to the intensity of the reflected rays are produced. The signals produced by photoelectronic device 6 are integrated and then digitized by a measuring circuit 35 and sent to system controller 18. When the integrated quantity reaches a predetermined value, a command signal for stopping the light emission of lamp 34 is produced by system controller 18 and fed to trigger circuit 33, and a circuit in charge circuit 31 is opened to stop the light emission.

System controller 18 functions to control the entire system of electronic camera 1, for example, in the control of image-producing portion 15, a predetermined control signal is sent to driving circuits 20, 22 on the basis of data from light-intensity detecting circuit 23 and, as a result, a suitable "photographic" exposure is obtained. Sometimes, in order to close image-processing circuit 25, recording circuit 24, and so forth in synchronism, a control signal is sent to those circuits in response to a signal from an operating element of the camera, for example, shutter switch 8. Similarly, in order to control the recording action involving magnetic head 26, a predetermined control signal is sent to servo circuits 27, 30. Further, by means of system controller 18, the timing for stopping the emission of lamp 34 is provided based on information about the light reflected from the object, which is provided by measuring circuit 35.

Moreover, the power supplied to each operating portion of the camera is also controlled by system controller 18. According to the block diagram of FIG. 4, the power that is supplied through socket 14, or by battery unit 10 when inserted in recess 9, through power source portion 38 is controlled by system controller 18 when supplied to image-producing portion 15, generating portion 17, and servo circuit 30, for example.

In FIG. 5A, which graphically shows the relationship between time and current, waveform (A) describes the current supplied to image-producing portion 15 to make its light measuring operation possible, waveform (B) describe the current supplied to recording portion 16 so as to enable motor 29 and so forth, and waveform (C) describes the current supplied to flash generating portion 17 to enable the condenser to be charged.

Figure 4:
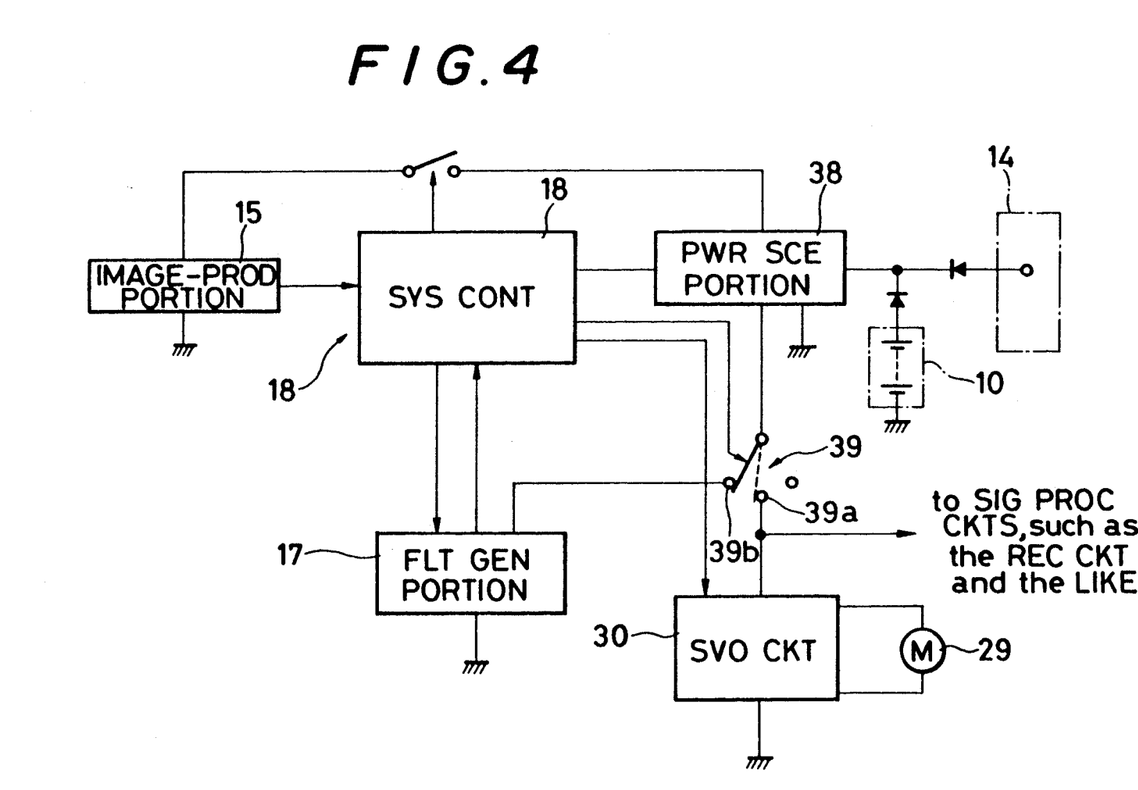
FIG. 4 is schematic in block diagram form of major elements of the electronic camera of FIG. 1.

When the shutter-release button 8 is pushed so far that only the first contacts 8a of switch 8c are closed, it is detected by system controller 18 and the power is supplied to image-producing portion 15. As a result, image sensor unit 19 is put in action and begins to measure the reflected light rays. Further, a switching control signal produced by system controller 18 closes a switching device 39, which has been opened, as indicated by the dashed lines in FIG. 4a. Specifically, the movable arm comes in contact with a stationary contact 39a. Thus, the power is supplied to motor 29 through servo circuit 30, as well as to other signal processing circuits.

While image-producing portion 15 is put in action, system controller 18 discriminates whether or not use of the flash is necessary based on the signals from light-intensity detecting circuit 23 and, if the flash is necessary, the movable arm of switching device 39 is brought into contact with a stationary contact 39b, as illustrated by the solid line in FIG. 4a. Thus, power is supplied to flash generating portion 17 to charge the main condenser of charge circuit 31. For the duration of charging, about 1 to 2 seconds, the supply of power to motor 29 and to the other circuits is temporarily interrupted.

When the charging operation is completed, a signal indicating that state is fed to system controller 18 and, as the result, the movable arm of switching device 39 is brought again into contact with stationary contact 39a under control of system controller 18. Thus, power is supplied to motor 29 and to the other circuits and the electronic camera is placed in a stand-by state preparatory to taking a picture.

In the electronic camera of this invention, because power is not supplied to the disc drive motor and to the other circuits while the main condenser of the flash generator is being charged, the current flowing from the power source can be concentrated in supplying only the flash generator, so that not only is the charge completed in a relatively short period of time, but also the power source is precluded from voltage drops that adversely influence the other circuits and cause malfunctions, erroneous readings, or the like.

The above description is given on a preferred embodiment of the invention, but it will be apparent that many modifications and variations could be effected by one skilled in the art without departing from the spirit or scope of the novel concepts of the invention, which should be determined by the appended claims.

What is claimed is:

1. An electronic camera comprising:
   image-signal producing means receiving light from an object for producing an output signal;
   a signal processing circuit for converting said output signal from said image-signal producing means to a recordable signal;
   recording means for recording said recordable signal from said signal processing circuit on a record medium;
   a motor for rotating said record medium;
   flash radiating means having a charging circuit for storing power requisite for radiating said flash;
   power supply means for supplying power to said motor and said charging circuit;
   switch means operable by a user of the camera; and
   controller means for controlling power supplied to said flash radiating means and said signal processing circuit in response to operation of said switch means and said charging circuit, wherein said power to said motor is interrupted by said controller means after operation of said switch means and during charging of said charging circuit, thereby accelerating charging of said charging circuit and preventing operation of said motor with insufficient voltage.

2. An electronic camera according to claim 2, in which said recording medium is a magnetic disc.

3. An electronic camera according to claim 2, in which said image-signal producing means provides a signal measuring the amount of light incident thereon and on the basis of said signal said charging circuit is charged.

4. An electronic camera according to claim 3, wherein said switch means comprises a release button operating a first switch and a second switch, determining means responsive to said first switch for determining when light measured by said light measuring means is lower than a predetermined value, and upon such determination said charging means is charged and power to said motor is interrupted by said controlling means.

5. An electronic camera comprising:
   image-signal means for producing a signal in response to light falling thereon;
   a signal processing circuit for converting output signals from said image-signal means to a recordable signal suitable for recording on a record medium;
   recording means for recording said recordable signals from the signal processing circuit including a motor for rotating said record medium;
   flash means including charge means for storing power requisite for causing said flash means to radiate light;
   power supply means for supplying power to said motor and said charge means;
   switch means operable by a user of the camera; and
   control means responsive to said switch means for controlling power supplied to said flash means and said signal processing circuit, wherein power to said motor and to said signal processing circuit is interrupted by said control means after operation of said switch means and for the duration of charging of said charge means, thereby accelerating charging of said charge means and preventing operation of said motor and said signal processing circuit with insufficient voltage.

6. An electronic camera according to claim 5, in which said record medium is a magnetic disc.

7. An electronic camera according to claim 6, in which said image-signal means provides a measure of the amount of light incident thereon and on the basis of said signal from said image-signal means, said charge means is charged and said power to said motor and to said signal processing circuit is interrupted by said control means.

8. An electronic camera according to claim 7, wherein said switch means comprises a release button for operating a first switch and a second switch, said first switch causing said image-signal means to measure the amount of light and means for determining when the measured light is lower than a predetermined value, whereby upon such determination said charge means is charged and said power to both said motor and to said signal processing circuit is interrupted by said controlling means.

* * * * *

UNITED STATES PATENT AND TRADEMARK OFFICE
CERTIFICATE OF CORRECTION

PATENT NO. : 5,218,451
DATED : June 8, 1993
INVENTOR(S) : Yasumasa Kodama, et. al.

It is certified that error appears in the above-indentified patent and that said Letters Patent is hereby corrected as shown below:

On the Title page, col. 2, line 20, change "Trouong" to --Truong--.
Column 3, line 40, change "o f" to --of--
Column 6, line 23, change "claim 2" to --claim 1--.

Signed and Sealed this

Twenty-eighth Day of June, 1994

Attest:

BRUCE LEHMAN

*Attesting Officer*      *Commissioner of Patents and Trademarks*